US012374796B2

(12) United States Patent
Kim et al.

(10) Patent No.: US 12,374,796 B2
(45) Date of Patent: Jul. 29, 2025

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Jong Min Kim, Gyeonggi-do (KR); Young Jun Lee, Seoul (KR); Yoon Ho Huh, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 166 days.

(21) Appl. No.: 17/945,509

(22) Filed: Sep. 15, 2022

(65) Prior Publication Data

US 2023/0018267 A1 Jan. 19, 2023

Related U.S. Application Data

(63) Continuation of application No. PCT/KR2021/003140, filed on Mar. 15, 2021.

(30) Foreign Application Priority Data

Mar. 16, 2020 (KR) ........................ 10-2020-0032104

(51) Int. Cl.
*H01Q 1/24* (2006.01)
*H01Q 1/38* (2006.01)
(Continued)

(52) U.S. Cl.
CPC ........... *H01Q 9/0414* (2013.01); *H01Q 1/241* (2013.01); *H01Q 1/243* (2013.01); *H01Q 1/38* (2013.01);
(Continued)

(58) Field of Classification Search
CPC ........ H01Q 9/0414; H01Q 1/241; H01Q 1/38; H01Q 1/422; H01Q 1/243; H01Q 1/44;
(Continued)

(56) References Cited

U.S. PATENT DOCUMENTS 11,316,264 B2 4/2022 Ryu et al.
2005/0052322 A1* 3/2005 Park ........................ H01Q 1/38 343/846
(Continued)

FOREIGN PATENT DOCUMENTS

CN 1591972 A 3/2005
CN 105470626 A 4/2016
(Continued)

OTHER PUBLICATIONS

International Search Report for PCT/KR2021/003140 mailed on Jun. 24, 2021.

*Primary Examiner* — Dameon E Levi
*Assistant Examiner* — Yonchan J Kim
(74) *Attorney, Agent, or Firm* — The PL Law Group, PLLC

(57) ABSTRACT

An antenna device according to an embodiment includes a dielectric layer including a high transmittance area and a low transmittance area, and an antenna unit disposed on the dielectric layer. The antenna unit includes a radiator disposed on the high transmittance area of the dielectric layer and having a mesh structure, a signal pad disposed on the low transmittance area of the dielectric layer and having a solid pattern structure, and an impedance matching pattern connecting the radiator and the signal pad on the low transmittance area of the dielectric layer. The impedance matching pattern has a larger width than that of the signal pad and has a solid pattern structure.

13 Claims, 6 Drawing Sheets

(51) Int. Cl.

| | |
|---|---|
| ***H01Q 1/42*** | (2006.01) |
| ***H01Q 1/44*** | (2006.01) |
| ***H01Q 9/04*** | (2006.01) |
| ***H01Q 9/30*** | (2006.01) |

(52) U.S. Cl.
CPC ............... *H01Q 1/422* (2013.01); *H01Q 1/44* (2013.01); *H01Q 9/30* (2013.01)

(58) Field of Classification Search
CPC ............ H01Q 21/08; H01Q 9/30; H01Q 1/36; H01Q 1/22; H01Q 9/0485; H01Q 5/335
See application file for complete search history.

(56) References Cited

U.S. PATENT DOCUMENTS

| | | | | |
|---|---|---|---|---|
| 2007/0069959 | A1 | 3/2007 | Wu | |
| 2015/0255856 | A1 | 9/2015 | Hong et al. | |
| 2016/0093939 | A1* | 3/2016 | Kim | H01Q 1/243 343/720 |
| 2019/0067834 | A1* | 2/2019 | Park | H01Q 5/385 |
| 2019/0097312 | A1 | 3/2019 | Ng et al. | |
| 2019/0181559 | A1 | 6/2019 | Mazaheri Kalahrudi et al. | |
| 2020/0266525 | A1 | 8/2020 | Kim et al. | |
| 2020/0411959 | A1 | 12/2020 | Ryu et al. | |
| 2021/0135337 | A1* | 5/2021 | Kim | H01Q 1/44 |

FOREIGN PATENT DOCUMENTS

| | | | | |
|---|---|---|---|---|
| CN | 214589233 | U | 11/2021 | |
| JP | 2006-287452 | A | 10/2006 | |
| KR | 10-2000-0019433 | A | 4/2000 | |
| KR | 10-2013-0095451 | A | 8/2013 | |
| KR | 10-2016-0036436 | A | 4/2016 | |
| KR | 10-1962821 | B1 | 7/2019 | |
| KR | 10-2020-0010906 | A | 1/2020 | |
| KR | 20200010906 | A * | 1/2020 | |
| KR | 10-2021-0079174 | A | 6/2021 | |
| KR | 10-2021-0115797 | A | 9/2021 | |
| WO | WO-2010044262 | A1 * | 4/2010 | H01Q 1/1271 |

* cited by examiner

Prior Art

ANTENNA DEVICE AND DISPLAY DEVICE INCLUDING THE SAME

PRIORITY

The present application is a continuation of application to International Application No. PCT/KR2021/003140, with an International Filing Date of Mar. 15, 2021 which claims the benefit of Korean Patent Application No. 10-2020-0032104 filed on Mar. 16, 2020 at the Korean Intellectual Property Office, the disclosures of which are incorporated by reference herein in their entirety.

BACKGROUND

1. Field

The present invention relates to an antenna device and a display device including the same. More particularly, the present invention relates to an antenna device including electrode patterns, and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device. Further, as the display device equipped with the antenna becomes thinner and light-weighted, a space for the antenna may be also decreased. Accordingly, a dimension of the antenna inserted into the display device may be decreased, and sufficient radiation and gain properties may not be easily achieved from the antenna.

When the antenna is combined with the display device, and an image quality may be degraded due to electrode structures included in the antenna. Further, radiation properties of the antenna may be deteriorated due to structures included in the display device.

Thus, an antenna construction having a thin film structure and improved compatibility with display device which is capable of providing a radiation in a desired high frequency or ultra-high frequency band is required. For example, Korean Patent Published Application No. 2013-0095451 discloses an antenna integrated with a display panel, which may not provide the sufficient compatibility with the display device.

SUMMARY

According to an aspect of the present invention, there is provided an antenna device having improved radiation property and signaling efficiency.

According to an aspect of the present invention, there is provided a display device including an antenna device with improved radiation property and signaling efficiency.

(1) An antenna device, including: a dielectric layer including a high transmittance area and a low transmittance area; and an antenna unit disposed on the dielectric layer, wherein the antenna unit includes: a radiator disposed on the high transmittance area of the dielectric layer, the radiator having a mesh structure; a signal pad disposed on the low transmittance area of the dielectric layer, the signal pad having a solid pattern structure; and an impedance matching pattern connecting the radiator and the signal pad on the low transmittance area of the dielectric layer, the impedance matching pattern having a larger width than that of the signal pad and having a solid pattern structure.

(2) The antenna device according to the above (1), wherein the impedance matching pattern has a length smaller than that of the radiator.

(3) The antenna device according to the above (2), wherein the impedance matching pattern has a length smaller than that of the signal pad.

(4) The antenna device according to the above (3), wherein a sum of the length of the impedance matching pattern and the length of the signal pad is smaller than a length of the radiator.

(5) The antenna device according to the above (1), wherein the impedance matching pattern directly contacts a side of the radiator.

(6) The antenna device according to the above (5), wherein the radiator includes a boundary pattern formed on the side in contact with the impedance matching pattern.

(7) The antenna device according to the above (6), wherein the mesh structure of the radiator includes a plurality of unit cells, and the boundary pattern continuously connects vertices of the unit cells positioned at the side of the radiator.

(8) The antenna device according to the above (6), wherein the boundary pattern protrudes from a lateral side of the radiator.

(9) The antenna device according to the above (6), wherein the boundary pattern is located at a boundary between the high transmittance area region and the low transmittance area.

(10) The antenna device according to the above (1), wherein a width of the impedance matching pattern gradually increases in a direction from the signal pad to the radiator.

(11) The antenna device according to the above (1), wherein the impedance matching pattern has a trapezoidal shape or a rectangular shape.

(12) The antenna device according to the above (1), wherein the impedance matching pattern wholly contact one side of the radiator.

(13) The antenna device according to the above (1), further including a dummy mesh pattern formed around the radiator on the high transmittance area of the dielectric layer.

(14) The antenna device according to the above (1), further including a ground pad disposed around the signal pad and spaced apart from the impedance matching pattern on the low transmittance area of the dielectric layer.

(15) A display device including the antenna device according to embodiments as described above.

(16) The display device according to the above (15), wherein the display device includes a display area and a peripheral area, and the high transmittance area of the antenna device corresponds to the display area of the display device, and the low transmittance area of the antenna device corresponds to the peripheral area of the display device.

According to exemplary embodiments of the present invention, an impedance matching pattern having a solid structure may be inserted between a radiator having a mesh structure and a signal pad. An additional transmission line connected to the radiator may be omitted and the impedance matching pattern may be used so that gain/radiation properties may be improved.

In some embodiments, a boundary pattern may be formed at a side of the radiator connected to the impedance matching pattern, thereby suppressing a signal loss and improving the gain properties.

In some embodiments, the radiator may be disposed in a high transmittance area or a display area, and the impedance matching pattern may be disposed in a low transmittance area together with the signal pad. A visual recognition of electrodes may be prevented while implementing antenna properties in the high transmittance area, and low resistance/signal efficiency may be implemented in the low transmittance region.

DETAILED DESCRIPTION OF THE EMBODIMENTS

According to exemplary embodiments of the present invention, there is provided an antenna device including a radiator, a signal pad and an impedance matching pattern connecting the radiator and the signal pad.

The antenna device may be, e.g., a microstrip patch antenna fabricated in the form of a transparent film. The antenna device may be applied to communication devices for a mobile communication of a high or ultrahigh frequency band corresponding to a mobile communication of, e.g., 3G, 4G, 5G or more.

According to exemplary embodiments of the present invention, there is also provided a display device including the antenna device. An application of the antenna device is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
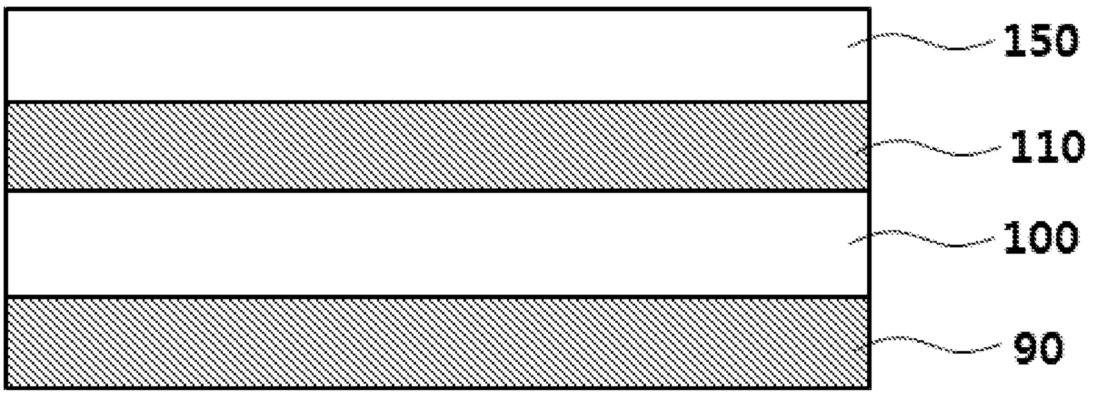
FIGS. 1 and 2 are a schematic cross-sectional view and a schematic top planar view, respectively, illustrating an antenna device in accordance with exemplary embodiments.
Figure 2:
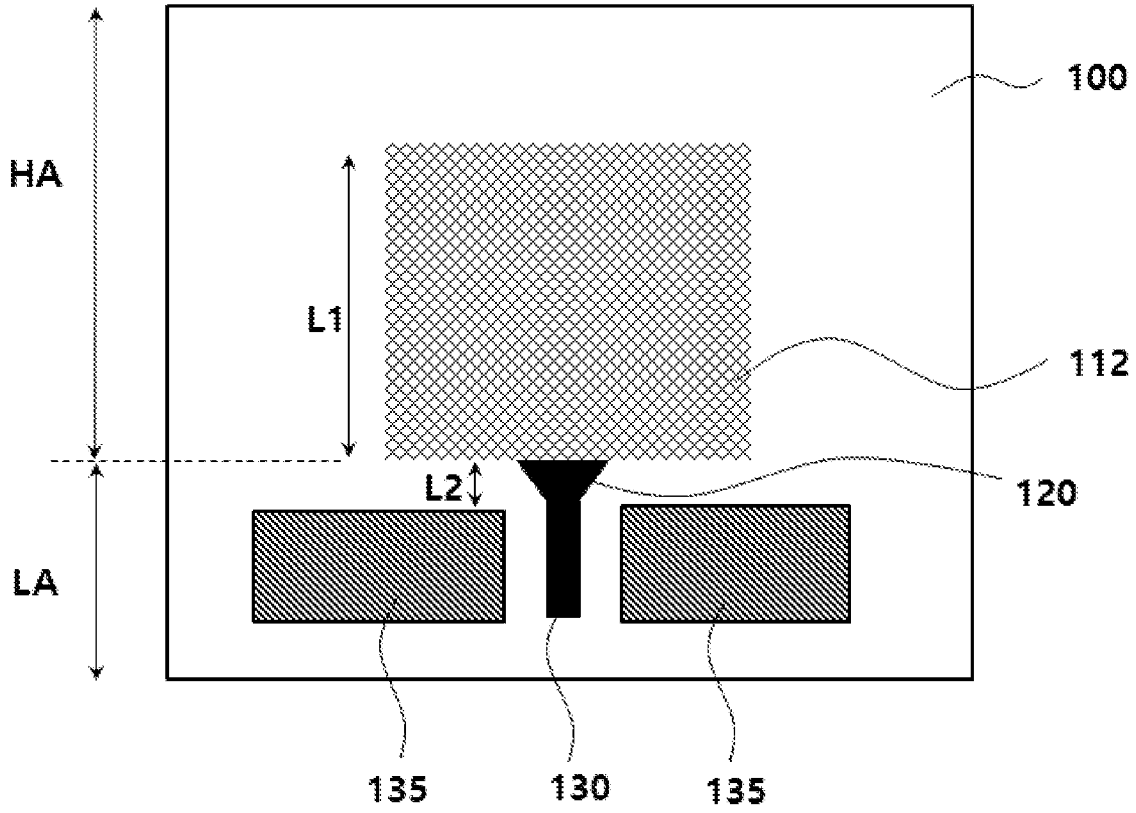

FIGS. 1 and 2 are a schematic cross-sectional view and a schematic top planar view, respectively, illustrating an antenna device in accordance with exemplary embodiments.

Referring to FIG. 1, the antenna device may include a dielectric layer 100 and an antenna pattern layer 110 disposed on a top surface of the dielectric layer 100.

The dielectric layer 100 may serve as a base dielectric layer or a lower dielectric layer of the antenna device. For example, capacitance or inductance may be generated between the antenna pattern layer 110 and a ground layer 90 facing each other by the dielectric layer 100, and radiation properties (e.g., a vertical radiation property), a frequency band, etc., of the antenna pattern layer 110 may be adjusted.

The dielectric layer 100 may include an insulating material having a predetermined dielectric constant. For example, the dielectric layer 100 may include a transparent flexible resin material such as a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), or the like may be included in the dielectric layer 100. In some embodiments, the dielectric layer 100 may include an inorganic insulating material such as glass, silicon oxide, silicon nitride, silicon oxynitride, etc.

The dielectric layer 100 may be provided as a substantially single layer. In an embodiment, the dielectric layer 100 may have a multi-layered structure including at least two layers.

In some embodiments, a dielectric constant of the dielectric layer 100 may be adjusted in a range from about 1.5 to about 12. When the dielectric constant exceeds about 12, a driving frequency may be excessively decreased, so that driving in a desired high frequency band may not be implemented.

The antenna pattern layer 110 may be formed on a top surface of the dielectric layer 100. The antenna pattern layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

For example, the antenna pattern layer 110 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna pattern layer 110 may include a transparent conductive oxide such indium tin oxide (ITO), indium zinc oxide (IZO), zinc oxide (ZnOx), indium zinc tin oxide (IZTO), etc.

In some embodiments, the antenna pattern layer 110 may include a stacked structure of a transparent conductive oxide layer and a metal layer. For example, the antenna pattern layer 110 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In an embodiment, the antenna pattern layer 110 may include a metamaterial.

Elements and structures of the antenna pattern layer 110 will be described later in more detail with reference to FIG. 2.

In some embodiments, a protective layer 150 may be formed on the antenna pattern layer 110. The protective layer 150 may include the above-described organic insulating material and/or inorganic insulating material. The protective layer 150 may serve as an upper dielectric layer or an encapsulation layer of the antenna device.

In some embodiments, the protective layer 150 may include an optical film such as a polarizing plate, a retardation film, an anti-reflection film, an anti-fingerprint film, an antistatic film, a hard coating film and a window film, or a cover glass.

In some embodiments, the ground layer 90 may be disposed on a bottom surface of the dielectric layer 100. The ground layer 90 may overlap the antenna pattern layer 110 with the dielectric layer 100 interposed therebetween. For example, a radiator 112 (see FIG. 2) of the antenna unit may be entirely superimposed on the ground layer 90 in a planar view.

In some embodiments, the ground layer 90 may be included as an independent element of the antenna device. In an embodiment, a conductive member of a display device to which the antenna device may be applied may serve as the ground layer 90.

For example, the conductive member may include various wirings or electrodes such as a gate electrode of a thin film transistor (TFT), a scan line, a data line, a pixel electrode, a common electrode, etc., included in a display panel.

In an embodiment, a metallic member such as a SUS plate, a sensor member such as a digitizer, a heat dissipation sheet, etc., disposed at a rear portion of the display device may serve as the ground layer 90.

Referring to FIG. 2, the antenna pattern layer 110 may include an antenna unit including the radiator 112 and a signal pad 130. The antenna unit may include an impedance matching pattern 120 disposed between the radiator 112 and the signal pad 130.

In exemplary embodiments, the dielectric layer 100 or the antenna device may include a high transmittance area HA and a low transmittance area LA. The high transmittance area HA may have a higher transmittance or transparency than that of the low transmittance area LA due to structures/elements of the antenna device and a display device disposed on and/or under the dielectric layer 100.

For example, the high transmittance area HA may correspond to a display area of the display device. The low transmittance area LA may correspond to a bezel area or a black matrix (BM) area of the display device.

The radiator 112 may have, e.g., a polygonal plate shape. In an embodiment, the radiator 112 may have a rectangular shape. However, the shape of the radiator 112 may be appropriately changed in consideration of radiation property, a patterning process, etc.

In exemplary embodiments, the radiator 112 may have a mesh structure and may be disposed on the top surface of the dielectric layer 100 in the high transmittance area HA. Accordingly, the antenna device may have a relatively high transmittance and an aperture ratio in the high transmittance area HA.

The signal pad 130 may be disposed on the top surface of the dielectric layer 100 in the low transmission area LA. The signal pad 130 may have a solid pattern structure. For example, the signal pad 130 may be a solid pattern including the above-described metal or alloy.

The signal pad 130 may have, e.g., a shape of a bar pattern extending in a length direction of the radiator 112. In some embodiments, a ground pad 135 may be disposed around the signal pad 130.

For example, a pair of the ground pads 135 may be electrically and physically separated from the signal pad 130 with the signal pad 130 interposed therebetween to face each other. The ground pad 135 may be also disposed in the low transmission area LA, and may have a solid pattern structure including the above-described metal or alloy.

The signal pad 130 may be electrically connected to an antenna driving integrated circuit (IC) chip. For example, a flexible printed circuit board (FPCB) and the signal pad 130 may be electrically connected to each other through an intermediate conductive structure such as an anisotropic conductive film (ACF).

The antenna driving IC chip may be disposed on the flexible printed circuit board. For example, the antenna driving IC chip may be directly mounted on the surface of the flexible printed circuit board. In an embodiment, the flexible printed circuit board may be connected to a rigid printed circuit board on which the antenna driving IC chip is mounted.

A feeding may be performed from the antenna driving IC chip to the radiator 112 through wirings included in the flexible printed circuit board and the signal pads 130, and radiation/driving of the antenna unit may be controlled.

The impedance matching pattern 120 may be disposed between the radiator 112 and the signal pad 130. In exemplary embodiments, the impedance matching pattern 120 may be disposed on the top surface of the dielectric layer 100 in the low transmittance area LA, and may have a solid pattern structure including the above-described metal or alloy.

In exemplary embodiments, the impedance matching pattern 120 may be directly connected to the radiator 112 and the signal pad 130. The impedance matching pattern 120 may extend from one end of the signal pad 130 to be directly connected to a side of the radiator 112.

For example, the impedance matching pattern 120 may be a portion at which a width of the signal pad 130 is increased. The impedance matching pattern 120 may serve as an intermediate pattern for performing a signal transmission, an impedance adjustment/balancing, etc., between the signal pad 130 and the radiator 112. In an embodiment, a portion of the impedance matching pattern 120 may also serve as the signal pad 130 according to, e.g., an alignment of the FPCB.

In some embodiments, a boundary between the high transmittance area HA and the low transmittance area LA may substantially correspond to a boundary between the radiator 112 and the impedance matching pattern 120. For example, a contact portion of the radiator 112 and the impedance matching pattern 120 may substantially coincide with the boundary between the high transmission area HA and the low transmission area LA.

In an exemplary embodiment, the radiator 112 may partially extend into the low-transmittance area LA in consideration of a process condition and a space of the display device. In an embodiment, the impedance matching pattern 120 may partially extend into the high transmittance area HA.

The impedance matching pattern 120 may be disposed only on the low transmittance area LA, and may not substantially extend to the high transmittance area HA. The impedance matching pattern 120 may function as an intermediate pattern for a mutual matching or modulating of a resistance of the signal pad 130 and a resistance of the radiator 112.

For example, the impedance matching pattern 120 may have a resistance corresponding to a geometric average of the resistance of the signal pad 130 and the resistance of the radiator 112, and may provide an impedance adjusting or matching for a radiation at a desired high frequency or ultrahigh frequency band of the antenna device.

Thus, an additional transmission line (e.g., having a mesh structure) in the high transmittance area HA may be omitted, and a distance between the signal pad 130 and the radiator 112 may be decreased, so that a gain reduction may be suppressed.

Further, the radiator 112 may be solely disposed in the high transmittance area HA, so that a size of the antenna device may be reduced. Accordingly, image quality may also be improved by reducing an area occupied by the antenna device in the display area of the display device.

The impedance matching pattern 120 may have a larger width than that of the signal pad 130. In some embodiments, as illustrated in FIG. 2, the impedance matching pattern 120 may have a shape, a width of which may gradually increase in a direction from the signal pad 130 to the radiator 112.

In some embodiments, a length of the impedance matching pattern 120 may be smaller than a length of the radiator 112. In an embodiment, the length of the impedance matching pattern 120 may be smaller than the length of the signal pad 130.

In some embodiments, the length L2 of the impedance matching pattern 120 may be about 1/5 or less, and preferably about 1/10 or less of the length L1 of the radiator 112. In an embodiment, the length L2 of the impedance matching pattern 120 may be about 1/50 or more of the length L1 of the radiator 112 in consideration of an impedance modulation effect.

In an embodiment, a sum of the lengths of the impedance matching pattern 120 and the signal pad 130 may be adjusted to be less than about 5 mm (e.g., in a frequency band of about 28 GHz). For example, the sum of the lengths of the impedance matching pattern 120 and the signal pad 130 may be adjusted in a range from about 0.5 mm to 5 mm.

Figure 3:
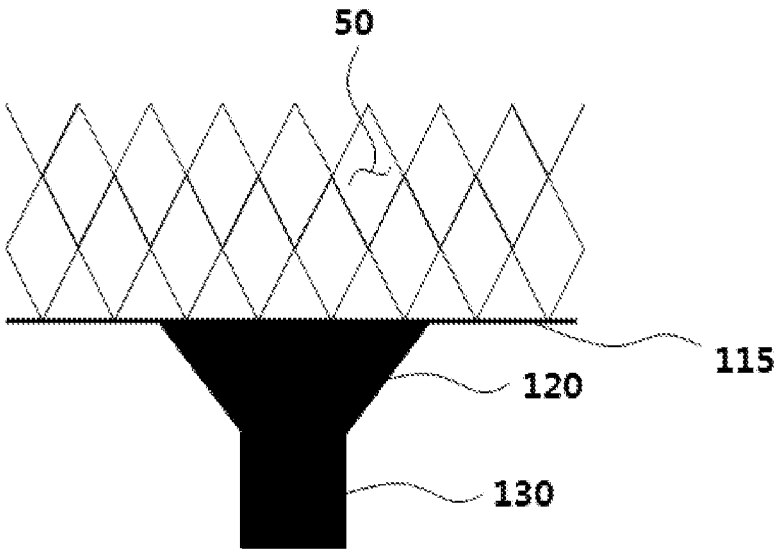
FIGS. 3 and 4 are schematic top planar views illustrating an antenna device in accordance with some exemplary embodiments.
Figure 4:
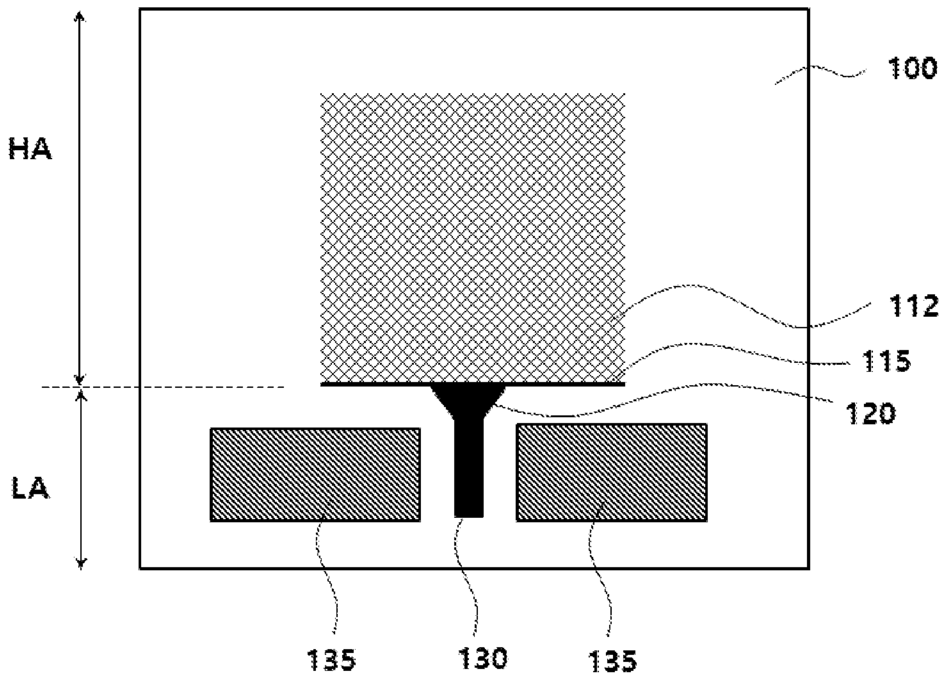

FIGS. 3 and 4 are schematic top planar views illustrating an antenna device in accordance with some exemplary embodiments. Specifically, FIG. 3 is a partially enlarged top planar view of the antenna pattern layer 110 around a boundary between the radiator 112 and the impedance matching pattern 120.

Referring to FIGS. 3 and 4, the radiator 112 may further include a boundary pattern 115. The impedance matching pattern 120 may contact the boundary pattern 115 and may be connected to the radiator 112.

A contact area between the radiator 112 and the impedance matching pattern 120 may be increased by the boundary pattern 115. Accordingly, feeding/signal efficiency by the impedance matching pattern 120 may be improved, and a gain property through the radiator 112 may also be improved.

As described above, the radiator 112 may have a mesh structure, and the mesh structure may include a plurality of unit cells 50 formed by electrode lines crossing each other. In some embodiments, the boundary pattern 115 may continuously connect vertices of the unit cells 50 arranged at one end or one side of the radiator 112 adjacent to the impedance matching pattern 120.

Accordingly, the unit cells 50 in contact with the impedance matching pattern 120 may not be substantially cut and may have a closed shape. Accordingly, a signal loss from the impedance matching pattern 120 may be prevented while improving radiation reliability.

In some embodiments, as illustrated in FIG. 4, the boundary pattern 115 may be selectively formed only at the one side of the radiator 112 that may contact the impedance matching pattern 120. For example, the boundary pattern 115 may be disposed at a boundary between the high transmittance area HA and the low transmittance area LA, and may not extend or may not be formed into the high transmittance area HA. In an embodiment, the boundary pattern 115 may at least partially overlay the high transmittance area HA.

Accordingly, the boundary pattern 115 may be prevented from being visually recognized by a user in the high transmittance area HA or the display area.

Figure 5:
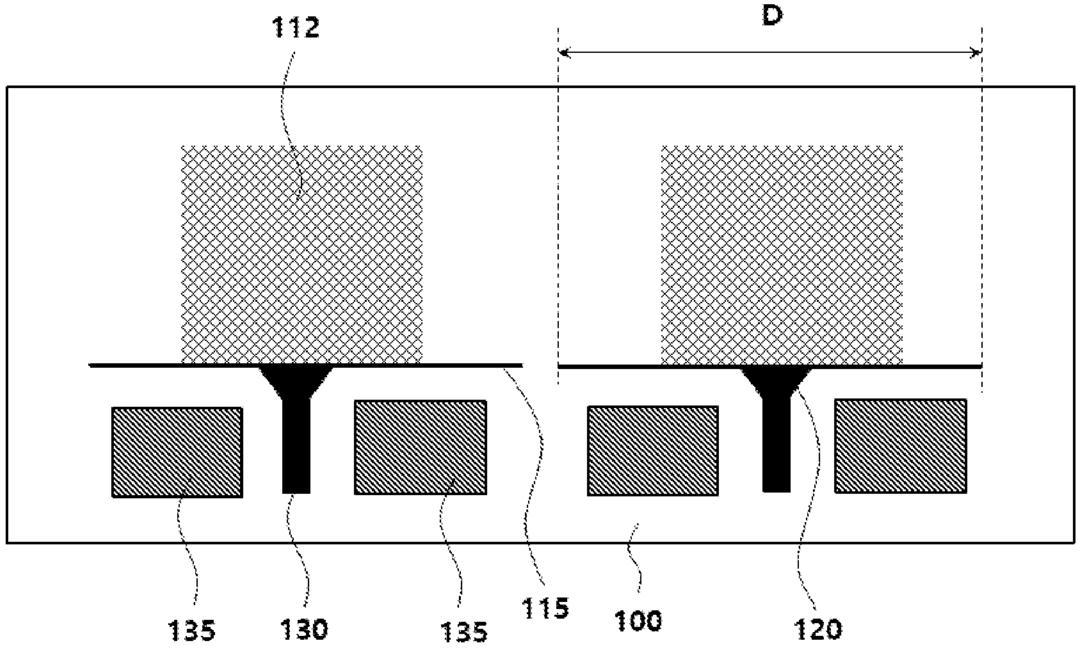
FIG. 5 is a schematic top planar view illustrating an antenna device in accordance with some exemplary embodiments.

FIG. 5 is a schematic top planar view illustrating an antenna device in accordance with some exemplary embodiments.

Referring to FIG. 5, a plurality of antenna units may be arranged on the dielectric layer 100 in an array form. The boundary pattern 115 may have a length greater than a length of one side of the radiator 112 in contact with the impedance matching pattern 120. In this case, the boundary pattern 115 may protrude from a lateral side of the radiator 112.

The length D of the boundary pattern 115 included in each antenna unit may be adjusted in consideration of an independence from the adjacent antenna units and an implementation of high-frequency/ultra-high frequency band communication. For example, the length D of the boundary pattern 115 may range from half a wavelength ($\lambda/2$) to one wavelength ($\lambda$) of a wavelength corresponding to a resonance frequency of the antenna unit.

In some embodiments, the length of the boundary pattern 115 may have a length smaller than that the length of one side of the radiator 112 in contact with the impedance matching pattern 120. For example, the boundary pattern 115 may connect some vertices of the unit cells 50 arranged at the one side of the radiator 112 in contact with the impedance matching pattern 120 to each other.

Figure 6:
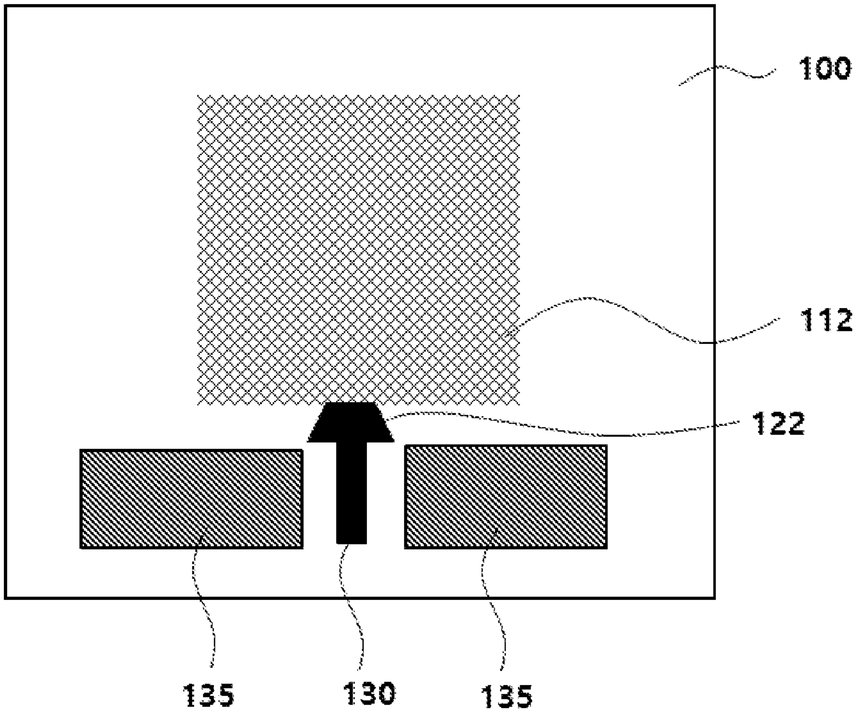
FIGS. 6 to 8 are schematic top planar views illustrating antenna devices in accordance with some exemplary embodiments.
Figure 7:
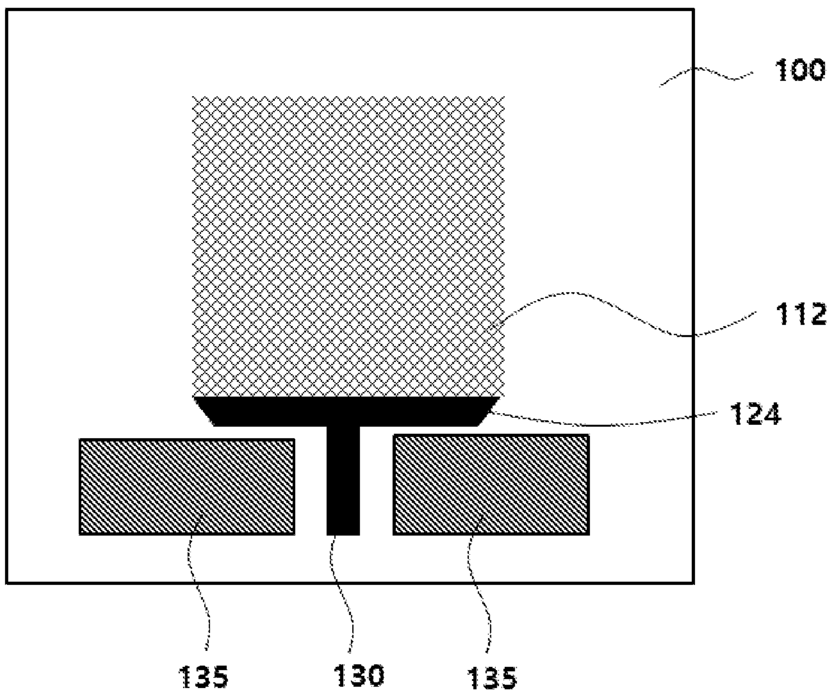
Figure 8:
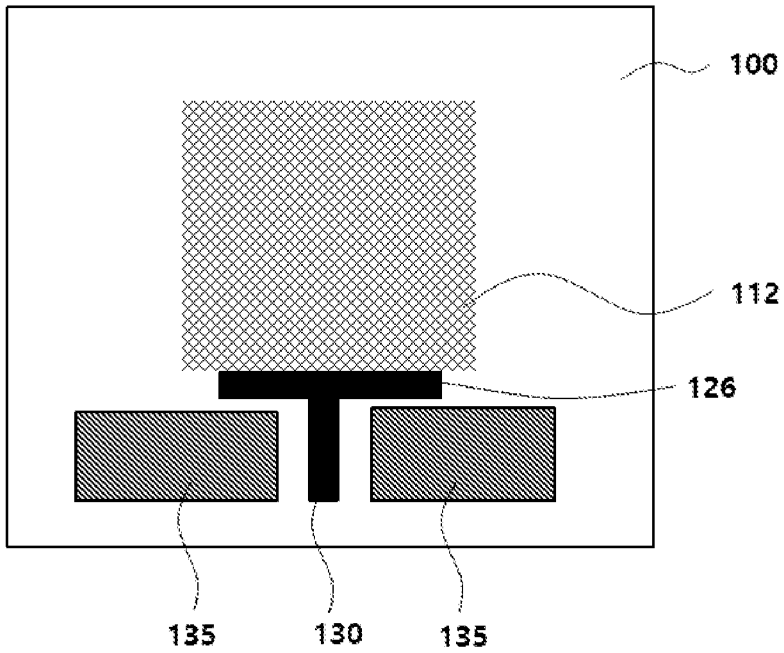

FIGS. 6 to 8 are schematic top planar views illustrating antenna devices in accordance with some exemplary embodiments. Detailed descriptions on elements and structures substantially the same as or similar to those described with reference to FIGS. 1 to 5 are omitted herein.

Referring to FIG. 6, an impedance matching pattern 122 may have a trapezoidal shape. For example, a width of the impedance matching pattern 122 may gradually decrease in a direction from the signal pad 130 to the radiator 112.

Referring to FIG. 7, an impedance matching pattern 124 may substantially entirely contact one side of the radiator 112.

Referring to FIG. 8, an impedance matching pattern 126 may have a rectangular shape having a width greater than that of the signal pad 130.

The shapes of the impedance matching patterns illustrated in FIGS. 6 to 8 are provided as exemplary embodiments, and may be appropriately changed in consideration of the above-described impedance modulation, signal efficiency, gain properties, etc.

Figure 9:
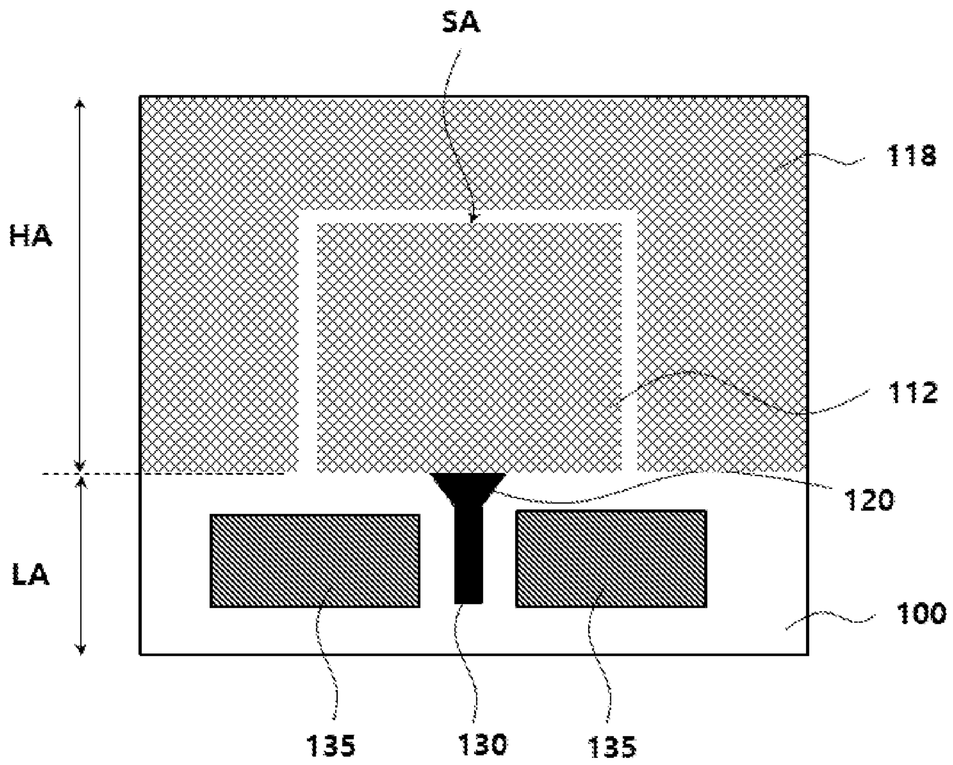
FIG. 9 is a schematic top planar view illustrating an antenna device in accordance with some exemplary embodiments.

FIG. 9 is a schematic top planar view illustrating an antenna device in accordance with some exemplary embodiments.

Referring to FIG. 9, a dummy mesh pattern 118 may be formed around the radiator 112. The dummy mesh pattern 118 may be formed on the top surface of the dielectric layer 100 in the high transmittance area HA. In an embodiment, the dummy mesh pattern 118 may be selectively formed only on the high transmittance area HA, and may be omitted on the low transmittance area LA.

For example, a conductive film may be formed on the dielectric layer 100. While etching the conductive layer to form a mesh structure, the conductive layer may be etched along a profile of the radiator 112 to form a separation region SA that may separate the radiator 112 and the dummy mesh pattern 120 from each other.

The dummy mesh pattern 118 may be arranged around the radiator 112, so that an optical uniformity of electrode patterns on the high transmittance area HA may be improved and a visibility of the electrode patterns may be suppressed.

Figure 10:
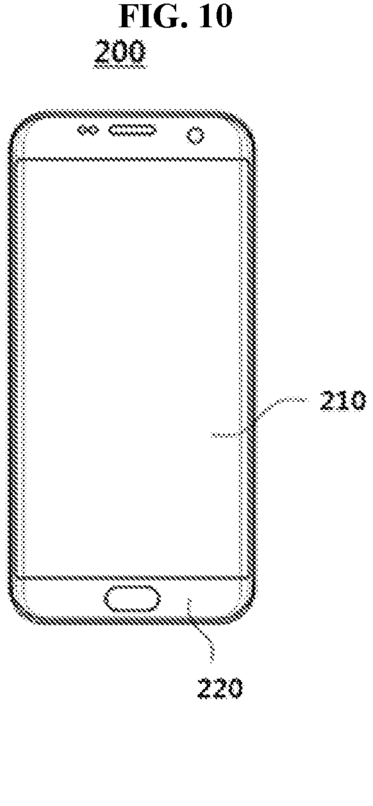
FIG. 10 is a schematic top planar view illustrating a display device in accordance with exemplary embodiments.

FIG. 10 is a schematic top planar view illustrating a display device in accordance with exemplary embodiments. For example, FIG. 10 illustrates an outer shape of a front portion including a window of a display device.

Referring to FIG. 10, a display device 200 may include a display area 210 and a peripheral area 220. For example, the peripheral area 220 may be disposed on both lateral portions and/or both end portions of the display area 210.

In some embodiments, the above-described antenna device may be inserted into the display device 200 in the form of a film or a patch. In exemplary embodiments, the high transmittance area HA of the antenna device may be disposed to correspond to the display area 210, and the low transmittance area LA of the antenna device may be disposed to correspond to the peripheral area 220.

The peripheral area 220 may correspond to, e.g., a light-shielding portion or a bezel portion of an image display device. Additionally, a driving circuit such as a driving IC chip of the display device 200 and/or the antenna device may be disposed in the peripheral area 220.

The signal pads 130 of the antenna device may be disposed to be adjacent to the driving circuit, so that signal loss may be suppressed by shortening a signal transmission/reception path. Further, the impedance matching pattern 120 may be utilized to additionally shorten the signal transmission/reception path, so that the gain property of the antenna device may be further improved.

As described above, the radiator 112 may include a mesh structure, and the antenna device may further include the dummy mesh pattern 118. Accordingly, the transmittance of the antenna device may be improved, and visible recognition of electrodes may be significantly reduced or suppressed. Thus, while maintaining or improving desired communication reliability, an image quality in the display area 210 may also be improved.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims

EXPERIMENTAL EXAMPLE

Example 1

An antenna device having the structure of FIG. 2 was manufactured. Specifically, the radiator 112 of a mesh structure, and the impedance matching pattern 120, the signal pad 130 and the ground pads 135 of a solid pattern structure were formed on a COP dielectric layer using a Cu—Ca alloy.

A length and a width of the radiator 112 were each formed to be 2.9 mm. The signal pad 130 had a length of 0.45 mm and a width of 0.2 mm. The impedance matching pattern 120 had a length of 0.2 mm and a width of an upper portion in contact with the radiator 112 was 0.5 mm.

Example 2

As illustrated in FIG. 4, an antenna device having the same structure as that of Example 1 was manufactured except that the boundary pattern 115 having a line width of 10 μm was formed on one side of the radiator 112.

Comparative Example

Figure 11:
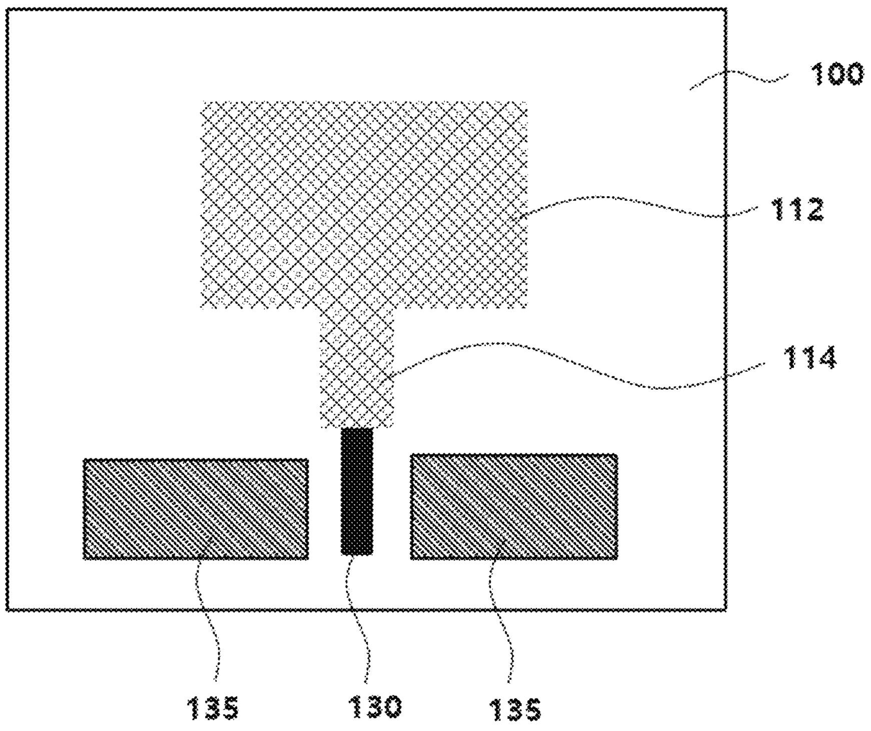
FIG. 11 is a schematic top planar view illustrating an antenna device in accordance with Comparative Example.

As illustrated in FIG. 11, the antenna device of Comparative Example was manufactured. Specifically, the antenna device was manufactured by the same method as that in Example 1 except that the impedance matching pattern 120 was omitted and a transmission line 114 having the same mesh structure as that of the radiator 112 was formed. The transmission line 114 had a length of 1.6 mm and a width of 0.5 mm.

Resonance frequency and antenna gain values were extracted in a radiation chamber while supplying power through the signal pad 130 of the antenna device of Examples and Comparative Example. The measurement results are shown in Table 1 below.

TABLE 1

| | Resonance Frequency (GHz) | Gain (dB) |
|---|---|---|
| Example 1 | 29.0 | 2.6 |
| Example 2 | 28.2 | 2.8 |
| Comparative Example | 30.0 | 1.1 |

Referring to Table 1, the antenna devices of Examples in which the transmission line was omitted and the impedance matching pattern was included provided explicitly improved gain values.

What is claimed is:

1. An antenna device, comprising: a dielectric layer including a high transmittance area and a low transmittance area; and an antenna unit disposed on the dielectric layer, the antenna unit comprising: a radiator disposed on the high transmittance area of the dielectric layer, the radiator having a mesh structure; a signal pad disposed on the low transmittance area of the dielectric layer, the signal pad having a solid pattern structure; and an impedance matching pattern connecting the radiator and the signal pad on the low transmittance area of the dielectric layer, the impedance matching pattern having a larger width than that of the signal pad and having the solid pattern structure, wherein the impedance matching pattern is an integral member with the signal pad and is directly connected to the signal pad without a transmission line, the impedance matching pattern directly and wholly contacts a side of the radiator, and the radiator includes a boundary pattern formed continuously and entirely on the side of the radiator in contact with the impedance matching pattern.

2. The antenna device according to claim 1, wherein the impedance matching pattern has a length smaller than a length of the radiator.

3. The antenna device according to claim 2, wherein the length of the impedance matching pattern is smaller than a length of the signal pad.

4. The antenna device according to claim 3, wherein a sum of the length of the impedance matching pattern and the length of the signal pad is smaller than the length of the radiator.

5. The antenna device according to claim 1, wherein the mesh structure of the radiator comprises a plurality of unit cells, and the boundary pattern continuously connects vertices of the plurality of unit cells positioned at the side of the radiator.

6. The antenna device according to claim 1, wherein the boundary pattern protrudes from a lateral side of the radiator.

7. The antenna device according to claim 1, wherein the boundary pattern is located at a boundary between the high transmittance area region and the low transmittance area.

8. The antenna device according to claim 1, wherein a width of the impedance matching pattern gradually increases in a direction from the signal pad to the radiator.

9. The antenna device according to claim 1, wherein the impedance matching pattern has a trapezoidal shape or a rectangular shape.

10. The antenna device according to claim 1, further comprising a dummy mesh pattern formed around the radiator on the high transmittance area of the dielectric layer.

11. The antenna device according to claim 1, further comprising a ground pad disposed around the signal pad and spaced apart from the impedance matching pattern on the low transmittance area of the dielectric layer.

12. A display device comprising the antenna device according to claim 1.

13. The display device according to claim 12, wherein the display device comprises a display area and a peripheral area; and the high transmittance area of the antenna device corresponds to the display area of the display device, and the low transmittance area of the antenna device corresponds to the peripheral area of the display device.

* * * * *